US008111409B2

(12) United States Patent
Tabata et al.

(10) Patent No.: US 8,111,409 B2
(45) Date of Patent: Feb. 7, 2012

(54) DETECTING APPARATUS AND RECORDING UNIT

(75) Inventors: Kunio Tabata, Shiojiri (JP); Kaneo Yoda, Okaya (JP); Toshiyuki Suzuki, Shiojiri (JP); Atsushi Oshima, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 630 days.

(21) Appl. No.: 12/250,813

(22) Filed: Oct. 14, 2008

(65) Prior Publication Data

US 2009/0097081 A1 Apr. 16, 2009

(30) Foreign Application Priority Data

Oct. 15, 2007 (JP) ................................ 2007-268355

(51) Int. Cl.
*H04N 1/40* (2006.01)

(52) U.S. Cl. ...................................... 358/1.12; 358/468

(58) Field of Classification Search .................. 358/296, 358/486, 488, 1.12, 463–468; 382/107, 236
See application file for complete search history.

(56) References Cited

U.S. PATENT DOCUMENTS

| | | | | |
|---|---|---|---|---|
| 7,652,609 | B2 * | 1/2010 | Kim et al. | 341/155 |
| 2010/0013989 | A1 * | 1/2010 | Zhou et al. | 348/441 |

FOREIGN PATENT DOCUMENTS

| | | |
|---|---|---|
| JP | 2001-121721 | 5/2001 |
| JP | 2002-013950 | 1/2002 |
| JP | 2002-254743 | 9/2002 |
| JP | 2003-145877 | 5/2003 |
| JP | 2003-175650 | 6/2003 |
| JP | 2005-238706 | 9/2005 |
| JP | 2006-056079 | 3/2006 |
| JP | 2006-213042 | 8/2006 |
| JP | 2007-155443 | 6/2007 |
| JP | 2007-160715 | 6/2007 |

* cited by examiner

*Primary Examiner* — Thomas D Lee
*Assistant Examiner* — Stephen M Brinich
(74) *Attorney, Agent, or Firm* — Workman Nydegger

(57) ABSTRACT

A detecting apparatus includes a target section in which target elements to be detected are arranged in the direction of the motion of a moving body; a detecting section that detects the target elements with the motion of the moving body and outputs a waveform signal having an output level corresponding to its detection sensitivity; a first-digital-signal output section that binarizes the waveform signal with reference to a first threshold to output a first digital signal; a second-digital-signal output section that binarizes the waveform signal with reference to a second threshold which is higher in absolute value than the first threshold to output a second digital signal; and a determining section that determines whether the second digital signal has changed in status.

6 Claims, 6 Drawing Sheets

DETECTING APPARATUS AND RECORDING UNIT

BACKGROUND

1. Technical Field

The present invention relates to a detecting apparatus including a target section in which target elements to be detected are arrayed in the direction of movement of a moving body and a detecting section that detects the target elements with the movement of the moving body and outputs a waveform signal with an output level responsive to its detection sensitivity.

The invention further relates to recording units typified by facsimile machines and printers and, in particular, to a recording unit configured to transport recording media by a transport belt having a transport surface moving in the direction of transportation of the recording media.

2. Related Art

Recording units typified by facsimile machines and printers have a detector for sensing the amount and speed of the motion of a moving body, for example, a carriage equipped with a record head, a transport belt for transporting recording media, and a transport roller for transporting the recording media.

Examples of the detector include a non-contact type and a contact type. One example of the non-contact type is a detecting apparatus equipped with a linear scale or a rotary scale serving as a target section in which target elements, such as a light transmitting section and a light shielding section, are alternately arrayed and a detecting section that detects the light transmitting section and the light shielding section with the motion of the moving body and outputs a waveform signal. One example of the contact type is a detecting apparatus equipped with a magnetic recording layer in which magnetic poles, the south pole and the north pole, are alternately arrayed and a detecting section that detects changes in the magnetic poles of the magnetic recording layer with the motion of the moving body and outputs a waveform signal.

Ink jet printers that record on a recording medium by ejecting ink sometimes become unable to detect the target elements because of adhesion of floating mist ink to the target elements. Recording units other than the ink jet type sometimes become unable to detect the target elements because of adhesion of paper powder generated in a paper transport path, abrasion powder generated from a sliding portion, or extraneous dust to the target element.

To solve the above problems, there are various arts. JP-A-2003-145877 describes a serial printer having a detector for detecting the abnormality of an encoder signal, and when an abnormal output of the encoder signal is detected, a motor for driving the carriage is stopped to thereby prevent the runaway of the carriage.

JP-A-2001-121721 discloses a recording unit in which a linear encoder sensor is cleaned when the contamination of the linear encoder sensor is detected. JP-A-2003-175650 discloses an image forming apparatus configured to compensate the dropout or changes of a carriage position signal to execute normal print control.

JP-A-2006-213042 describes an image forming apparatus in which when the contamination of an encoder is detected, abnormality information is sent to a display device or the like of the operation panel to inform the user of the generation of the contamination of the encoder.

JP-A-2002-13950 describes an encoder that determines the midpoint of the slits of an encoder scale plate by determining the midpoint of the distribution of the electric signals output from a photo detector using two thresholds for the output level of the electric signals to find the mean value of the midpoints determined using the individual thresholds as the midpoint of the slits.

If the distribution of the electric signals is distorted because of the contamination or foreign matter, such as dust, adhered to the encoder scale plate, so that the difference between the midpoints of the distribution of the electric signals determined using the two thresholds becomes larger than a predetermined value, the encoder does not use the midpoints determined using the individual thresholds to determine the slit midpoint position, thereby minimizing errors as soon as possible.

Although there are various arts for solving the problems due to the contamination of target elements, the following technical problems still remain. In the serial printer described in JP-A-2003-145877, if an abnormal output of the encoder signal is detected, the operation of the motor for driving the carriage is stopped, so that the printing operation is stopped halfway, thus resulting in the waste of recording paper. Such a technical problem and means for solving this problem are not described also in JP-A-2001-121721, JP-A-2003-175650, and JP-A-2002-13950.

The image forming apparatus described in JP-A-2006-213042 is configured not to disable the use of the apparatus soon if the contamination is slight by determining that the encoder is contaminated only when two or more times of abnormal speed occur at the same portion of the encoder scale.

However, if two or more times of abnormal speed occur at the same portion of the encoder scale, printing is stopped, and the origin point of the carriage is adjusted, and then the remaining printing is executed. This may cause a waste of paper at the stop of the printing. If printing on paper is stopped, and the origin point of the carriage is adjusted and then the printing is started again, the recording quality may be extremely deteriorated.

SUMMARY

An advantage of some aspects of the invention is to provide a detecting apparatus in which recording paper is not wasted and recording quality is not deteriorated even if target elements are contaminated.

A detecting apparatus according to a first aspect of the invention includes a target section in which target elements to be detected are arranged in the direction of the motion of a moving body; a detecting section that detects the target elements with the motion of the moving body and outputs a waveform signal having an output level corresponding to its detection sensitivity; a first-digital-signal output section that binarizes the waveform signal with reference to a first threshold to output a first digital signal; a second-digital-signal output section that binarizes the waveform signal with reference to a second threshold which is higher in absolute value than the first threshold to output a second digital signal; and a determining section that determines whether the second digital signal has changed in status.

The detecting apparatus according to the first aspect of the invention has two thresholds (a first threshold and a second threshold) as thresholds for the output level of the waveform signal output form the detecting section. The second threshold is higher in absolute value than the first threshold. Therefore, when the detection sensitivity of the target elements is reduced because of the contamination or the like of the target section to decrease the output level (amplitude) of the waveform signal, the output level first falls below the second threshold, which stops the change in the status of the second digital signal. When the fact that the status change of the second digital signal stops is determined by the determining section, it can be determined that the target section is contaminated.

The fact that the waveform signal output from the detecting section has an output level higher than a certain level, that is, the output level exceeds the first threshold indicates that the detecting section detects the target elements at an accuracy higher than a certain level. Thus, the first digital signal continues the status change including the rising edge and the trailing edge. In other words, even if the contamination of the target section is detected, the status change of the first digital signal as a result of the detection of the target elements is continued under predetermined conditions.

Accordingly, for example, when this detecting apparatus is applied to the detection of the operation of the moving body constituting a recording unit that records on a recording medium, the detection of the operation of the moving body can be continued using the first digital signal even if the contamination of the target section is detected, so that the current printing operation on a recording medium can be completed without interrupting or stopping the recording operation halfway. This prevents recording media from being wasted and the recording quality from being deteriorated. The detection accuracy of the detecting apparatus can be recovered by informing the user of the contamination of the target section after the completion of the recording operation or by cleaning the target section.

The detecting apparatus according to the first aspect of the invention may further include a cleaning unit that cleans the target section; and a control section that controls the cleaning unit to execute the cleaning of the target section when the determining section determines that the second digital signal has not changed in status.

In this case, the detecting apparatus includes a cleaning unit; and a control section that controls the cleaning unit to execute the cleaning of the target section when the determining section determines that the second digital signal has not changed in status. Thus, the detection accuracy of the detecting apparatus can be recovered.

The detecting apparatus according to the first aspect of the invention may be configured such that the determining section includes a latch circuit that latches the output signal at HIGH or LOW by receiving a latch signal; an up-down counter that starts counting-down synchronized with a clock at a rising edge of the second digital signal and starts counting-up synchronized with the clock at a trailing edge or, alternatively, starts counting-up synchronized with the clock at a rising edge and starts counting-down synchronized with the clock at a trailing edge, wherein when the count exceeds a maximum value or when the count falls below a minimum value, outputs a latch signal to the latch circuit; and a count-data input section that receives input of data for designating the maximum value or the minimum value of the count.

This configuration allows the maximum value and the minimum value of the count of the up-down counter, that is, reference values for determining whether the second digital signal has changed in status to be adjusted, thereby allowing the status of the second digital signal to be determined using appropriate reference values corresponding to the moving speed and speed change of the moving body.

A recording unit according to a second aspect of the invention includes a transport belt that forms a transport surface moving in the direction of transportation of a recording medium; a target section, provided on the transport belt, in which target elements to be detected are arranged in the direction of the transportation of the recording medium; a detecting section that detects the target elements with the movement of the transport surface and outputs a waveform signal having an output level corresponding to its detection sensitivity; a first-digital-signal output section that binarizes the waveform signal with reference to a first threshold to output a first digital signal; a recording unit that executes a recording operation on the recording medium in accordance with the first digital signal; a second-digital-signal output section that binarizes the waveform signal with reference to a second threshold which is higher in absolute value than the first threshold to output a second digital signal; and a determining section that determines whether the second digital signal has changed in status.

This configuration uses two thresholds for the output level of the waveform signal output from the detecting section, as in the first aspect of the invention. Therefore, even if the contamination of the target section is detected, the status change of the first digital signal is continued under predetermined conditions.

Accordingly, even if the contamination of the target section is detected, the recording operation can be continued using the first digital signal, thus allowing the current recording operation on the recording medium can be completed without interrupting or stopping the recording operation halfway. This prevents recording media from being wasted and the recording quality from being deteriorated.

The recording unit according to the second aspect of the invention may further include a cleaning unit that cleans the target section; and a control section that, when the determining section determines that the second digital signal has not changed in status, controls the cleaning unit to execute the cleaning of the target section after completion of the current recording on a recording medium.

This recording unit further includes a cleaning unit that cleans the target section; and a control section. When the determining section determines that the second digital signal has not changed in status, the cleaning unit executes the cleaning of the target section. Thus, the detection accuracy of the detecting apparatus can be recovered.

Even if the abnormality, such as contamination, of the target section is detected during the recording of a recording medium, the control unit controls the cleaning unit to execute the cleaning after completion of the current recording on the recording medium. This prevents recording media from being wasted and the recording quality from being deteriorated by the interruption of the recording operation.

The recording unit according to the second aspect of the invention may configured such that the determining section includes a latch circuit that latches the output signal at HIGH or LOW by receiving a latch signal; an up-down counter that starts counting-down synchronized with a clock at a rising edge of the second digital signal and starts counting-up synchronized with the clock at a trailing edge or, alternatively, starts counting-up synchronized with the clock at a rising edge and starts counting-down synchronized with the clock at a trailing edge, wherein when the count exceeds a maximum value or when the count falls below a minimum value, outputs a latch signal to the latch circuit; and a count-data input section that receives input of data for designating the maximum value or the minimum value of the count.

This configuration allows the maximum value and the minimum value of the count of the up-down counter, that is, reference values for determining whether the second digital signal has changed in status to be adjusted, thereby allowing the status of the second digital signal to be determined using appropriate reference values corresponding to the driving speed and speed change of the moving body.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
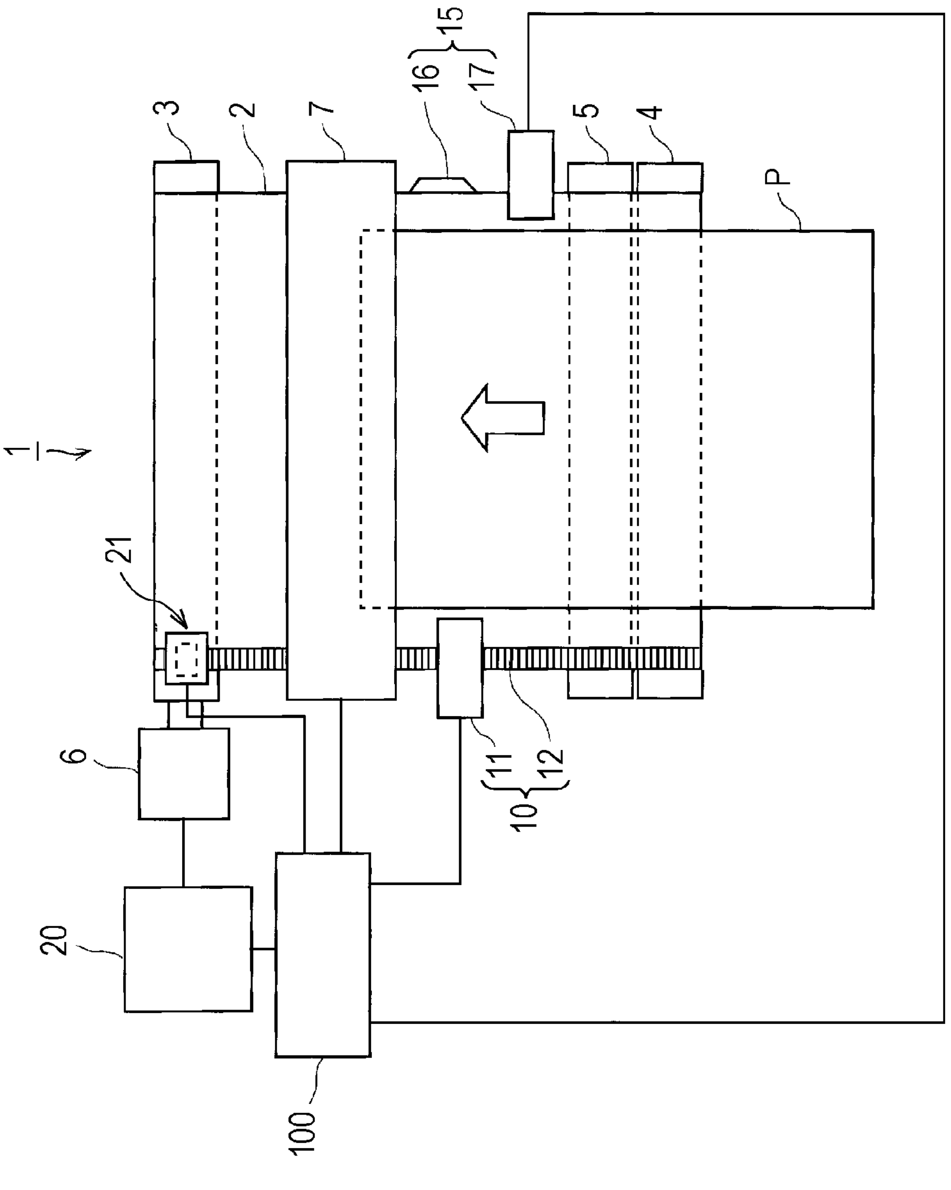
FIG. 1 is a schematic plan view of the essential parts of a printer according to an embodiment of the invention.
Figure 2:
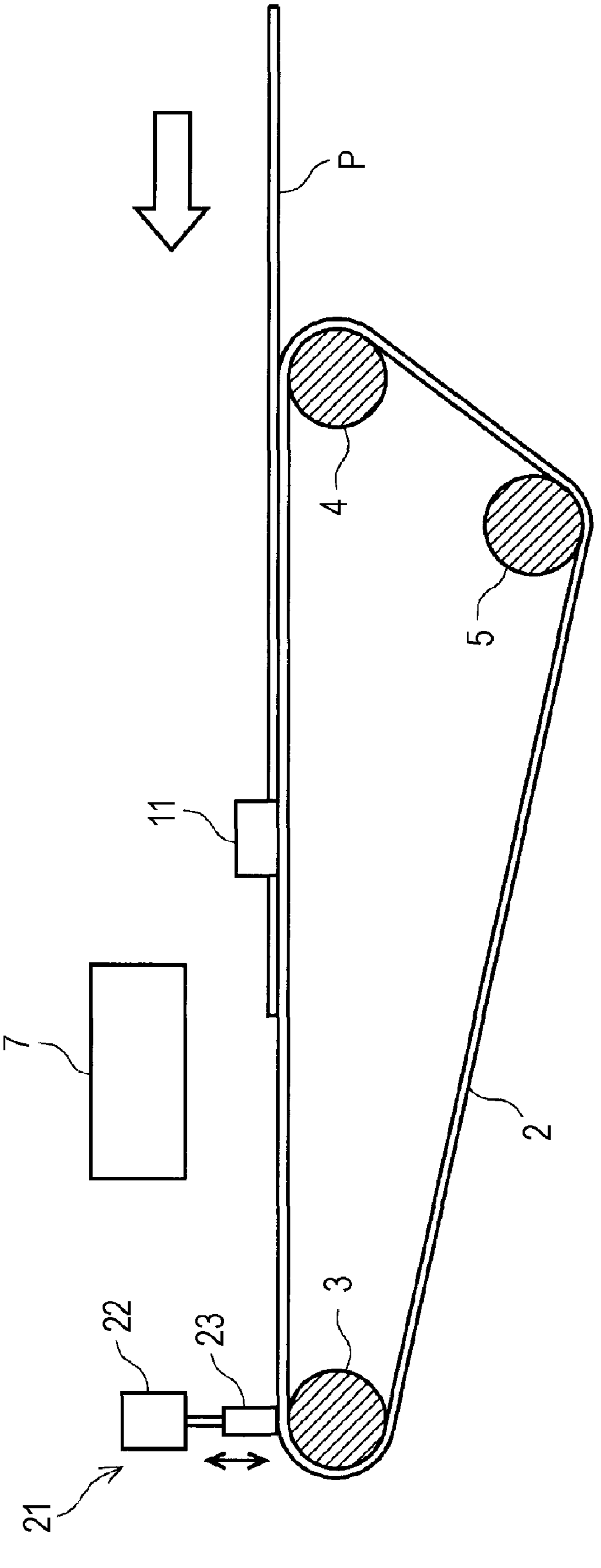
FIG. 2 is a side view of the essential parts of the printer according to this embodiment of the invention.
Figure 3:
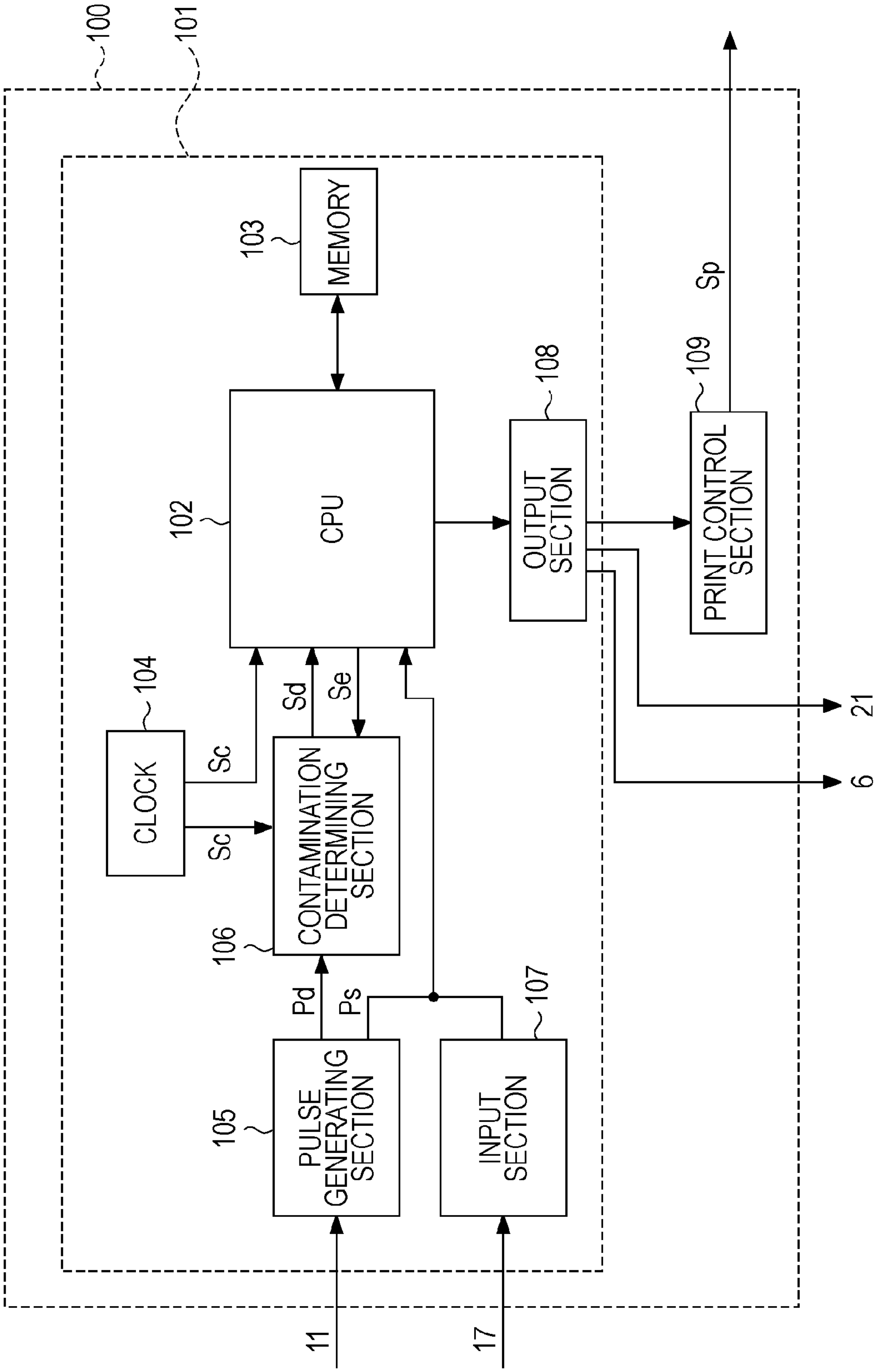
FIG. 3 is a block diagram showing the structure of a control unit for controlling the printer of this embodiment.
Figure 4A:
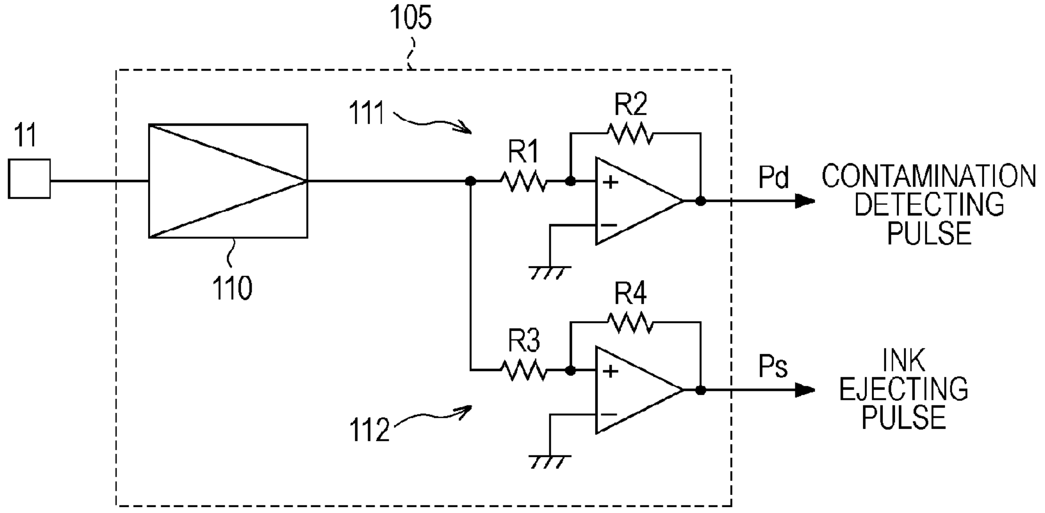
FIG. 4A is block diagram showing the configuration of a pulse generating section.
Figure 4B:
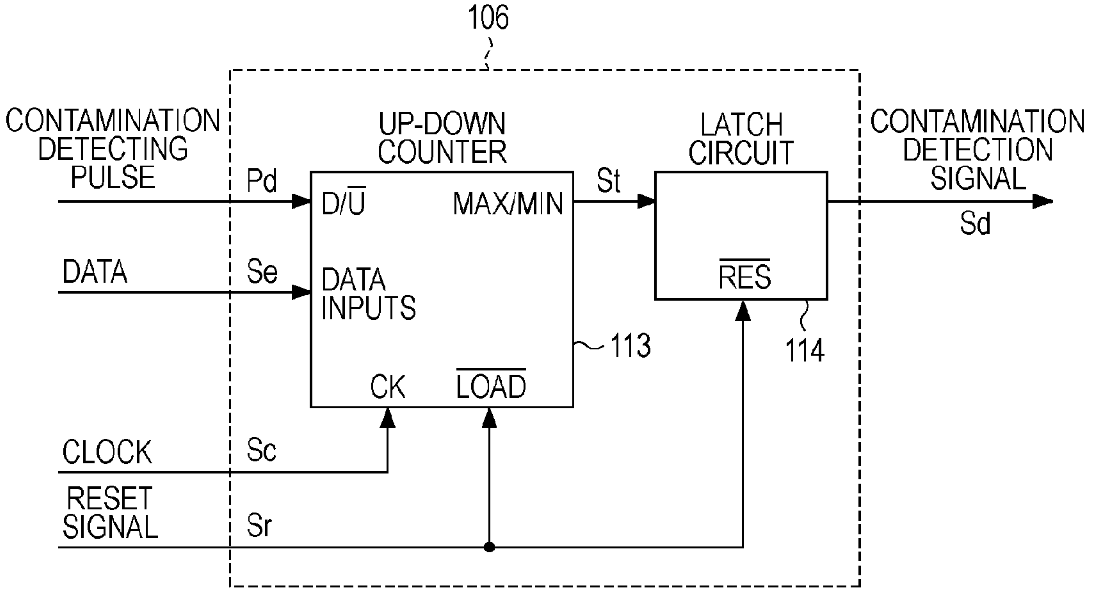
FIG. 4B is a block diagram showing the configuration of a contamination determining section.
Figure 5:
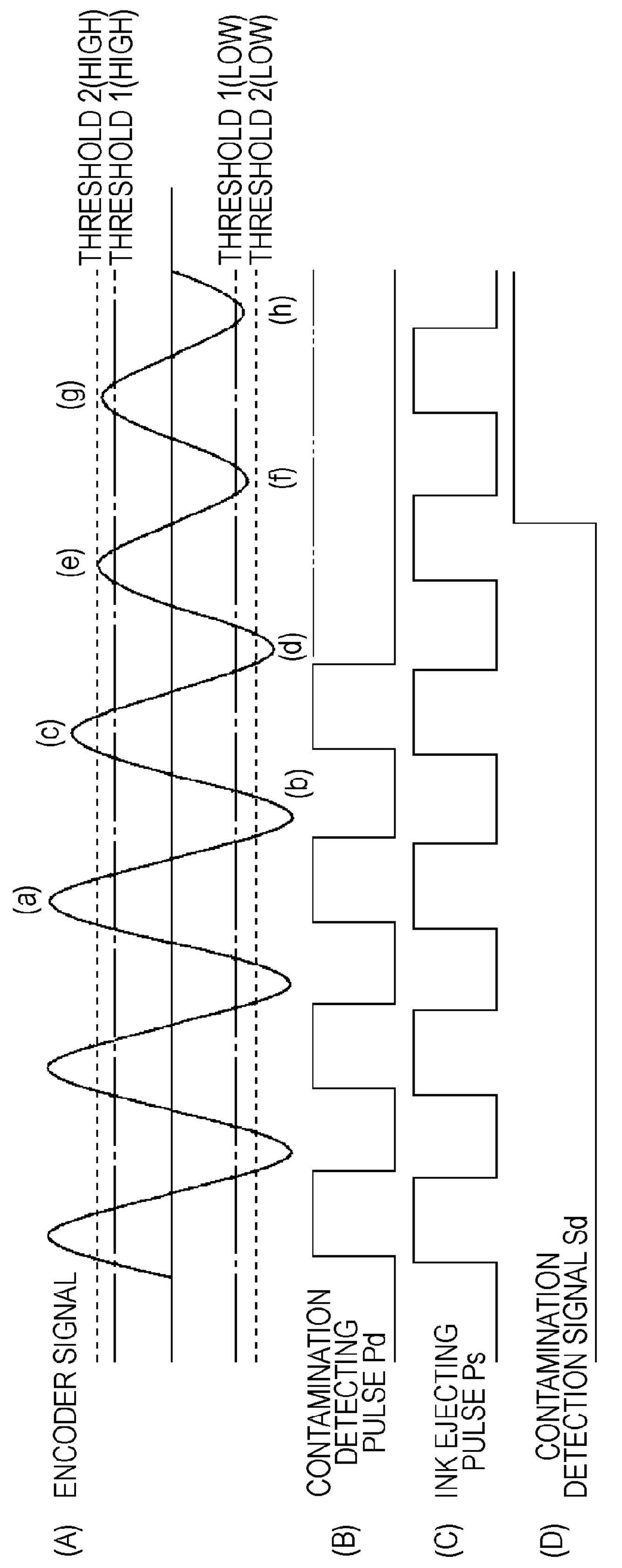
FIG. 5 is a diagram showing the waveforms of the input/output signals of the pulse generating section and the contamination determining section.
Figure 6:
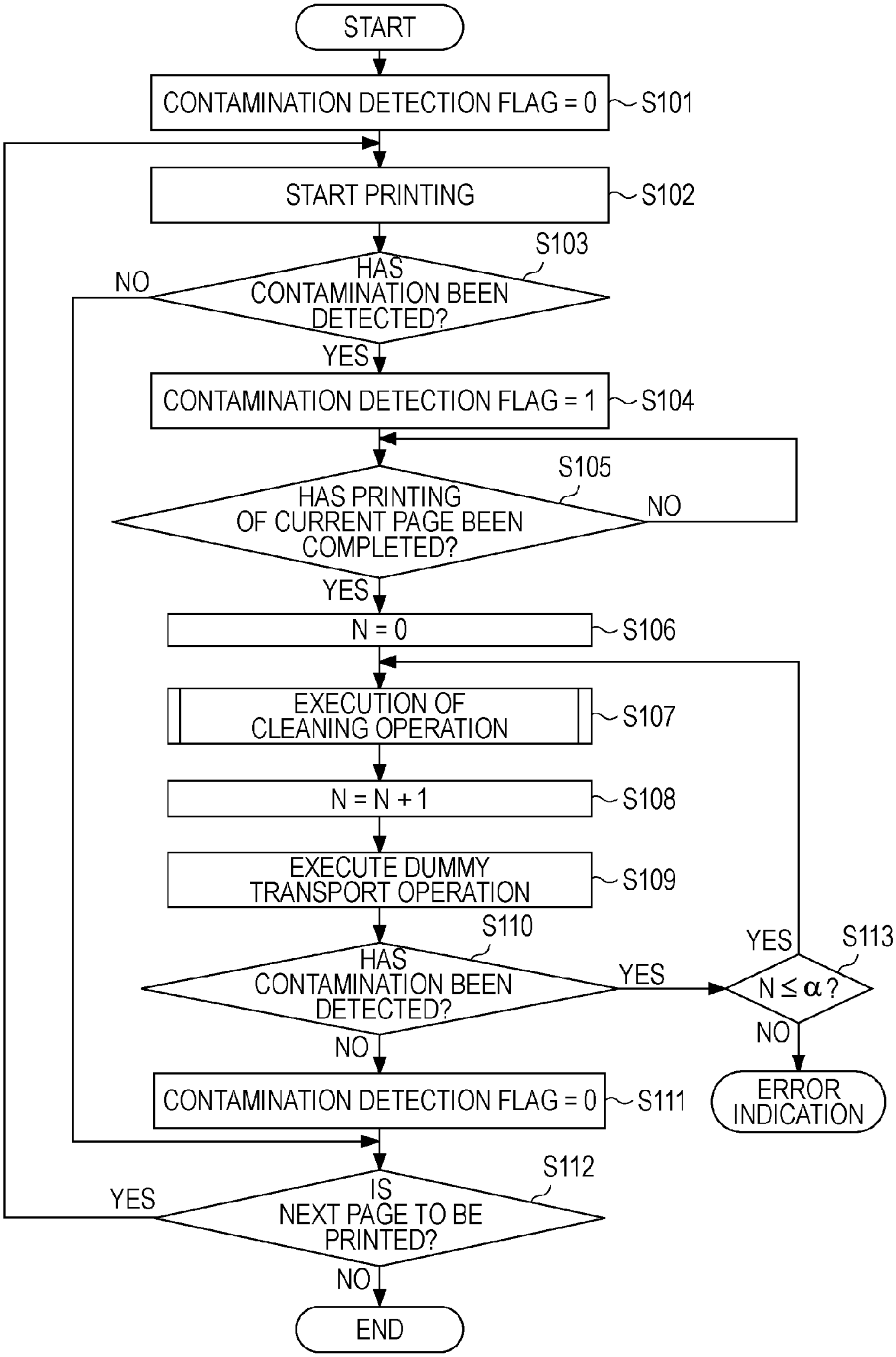
FIG. 6 is a flowchart for the control when contamination is detected.

An ink jet printer (hereinafter referred to as a printer) 1, corresponding to a recording unit, and a detecting apparatus 10 according to an embodiment of the invention will be described with reference to the drawings. FIG. 1 is a schematic plan view of the essential parts of the printer 1. FIG. 2 is a side view of the same. FIG. 3 is a block diagram showing the structure of a control unit 100 for controlling the printer 1. FIG. 4A is block diagram showing the configuration of a pulse generating section 105. FIG. 4B is a block diagram showing the configuration of a contamination determining section 106. FIG. 5 is a diagram showing the waveforms of the input/output signals of the pulse generating section 105 and the contamination determining section 106. FIG. 6 is a flowchart for the control when the contamination of a target section 12 is detected.

The printer 1 of this embodiment is a high-throughput ink jet printer that employs a so-called line head system using a record head 7 having a length to cover the width of paper, which executes recording by ejecting ink from the record head 7 while moving recording paper P, one example of recording media, in the direction of transportation without moving an ink discharge head back and forth along the paper width.

More specifically, as shown in FIGS. 1 and 2, the printer 1 includes a transport belt 2 that forms a transport surface for transporting the recording paper P in the direction of transportation (the direction of the arrow in FIGS. 1 and 2: upward in FIG. 1 and leftward in FIG. 2) and a plurality of rollers (a driving roller 3 and driven rollers 4 and 5) that roll on the transport belt 2. Numeral 6 denotes a drive motor for driving the driving roller 3, numeral 20 denotes a motor driving circuit for controlling the drive motor 6, and numeral 100 denotes a control unit for controlling the components of the printer 1 including the motor driving circuit 20.

The transport belt 2 is an insulating belt, which is formed of insulating resin, such as PET, polyimide, or fluoroethylene plastic. The transport belt 2 is charged with electricity by a charging device (not shown), so that the recording paper P on the transport surface is electrostatically attracted to the transport belt 2 and reliably transported in the direction of transportation.

The record head 7 that ejects ink is disposed opposite the transport surface of the transport belt 2. The record head 7 has color-ink discharge nozzles of, for example, yellow, magenta, cyan, and black (not shown) shifted in position in the direction of transportation of the recording paper P. The ink discharge nozzles are supplied with inks from individual ink tanks (not shown) through ink supply tubes (not shown).

The ink discharge nozzles each eject a necessary amount of ink drops to form micro ink dots on the recording paper P. This is performed for each color so that recording is completed merely by one pass of the recording paper P attracted to the transport belt 2 therethrough.

One side of the transport belt 2 perpendicular to the paper transport direction (the paper width direction) has the target section 12, which constitutes the detecting apparatus 10, integrated with the transport belt 2. The target section 12 is provided continuously along the transport direction of the transport belt 2. At a position opposite the target section 12 is provided a detecting section 11 that constitutes the detecting apparatus 10.

The target section of this embodiment is formed of a magnetic recording layer. This magnetic recording layer has magnetic poles S and N, corresponding to target elements, arranged alternately at a predetermined pitch in the transport direction. The detecting section 11 of this embodiment is formed of a contact-type magnetic playback head, which detects changes in the magnetic pole of the target section 12 (S, N, S, N . . . ) with the motion of the transport belt 2 and outputs a waveform signal with an output level (amplitude) responsive to the detection sensitivity.

The side of the transport belt 2 remote from the target section 12 has an origin-point detection unit 15 having an origin point (a tab 16) and an origin-point detecting section 17. The origin-point detection unit 15 detects a specified point of the transport belt 2, that is, an origin point.

A position of the transport belt 2 opposite the target section 12 has a cleaning unit 21 having a cleaning member 23 and an electromagnetic plunger 22. The cleaning member 23 comes into contact with the target section 12 to remove foreign matter, such as ink mist and dust, adhered to the target section 12.

It is desirable to form the cleaning member 23 from a high-ink-absorbing material or an ink-proof material, such as a fiber material, for example, unwoven cloth, or a porous material, for example, sponge. However, the cleaning member 23 may be made of any material that can clean the target section 12. The cleaning member 23 may be a wiper that wipes the target section 12.

The electromagnetic plunger 22 pushes the cleaning member 23 according to an instruction from the control unit 100 so as to bring the cleaning member 23 into contact with the target section 12 or draws the cleaning member 23 so as to be separated from the target section 12. Thus the target section 12 is cleaned only at necessary timing. This prevents the cleaning member 23 from always coming into contact with the target section 12 to put a transportation load on the transport belt 2 during recording, thus preventing deterioration of recording quality.

Referring next to FIG. 3, the configuration of the control unit 100 will be described. The control unit 100 includes a main control section 101 and a print control section 109 for controlling the record head 7 under the control of the main control section 101. The main control section 101 includes a CPU 102, a memory 103, a clock 104, a pulse generating section 105, a contamination determining section 106 corresponding to a determining section, an input section 107, and an output section 108.

The CPU 102 executes an operation program stored in the memory 103 to perform various processing operations while exchanging signals and data with the other components of the main control section 101. The memory 103 temporarily stores the above-mentioned operation program, various operation parameters, and various process data generated during the operation of the CPU 102. The clock 104 outputs a clock signal Sc necessary for various processing operations to the CPU 102 and the contamination determining section 106.

The input section 107 receives an origin-point detection signal output from the origin-point detecting section 17 of the origin-point detection unit 15 and signals detected by the other sensors provided in the printer 1 and converts the signals to signals suitable for the CPU 102.

The pulse generating section 105 receives a waveform signal having an output level responsive to the detection sensitivity of the target section 12 from the detecting section 11 of the detecting apparatus 10, and processes the waveform signal to generate a contamination detecting pulse Pd and an ink ejecting pulse Ps according to the cycle of the waveform signal. The contamination detecting pulse Pd is output to the contamination determining section 106, while the ink ejecting pulse Ps is output to the CPU 102.

The contamination determining section 106 determines the output state of the ink ejecting pulse Ps from the pulse generating section 105, and when detecting transition from a state in which the contamination detecting pulse Pd is output (an output state) to a state in which the contamination detecting pulse Pd is not output (a non-output state), the contamination determining section 106 outputs a signal indicative of the transition (hereinafter referred to as a contamination detection signal) Sd to the CPU 102.

The print control section 109 generates a driving signal Sp for driving the record head 7 in response to the ink ejecting pulse Ps generated by the pulse generating section 105 of the main control section 101. Specifically, the print control section 109 arranges the driving signal Sp into a waveform synchronized with the timing of the ink ejecting pulse Ps so that the record head 7 operates in synchronism with the ink ejecting pulse Ps, that is, the record head 7 discharges one ink drop in correspondence with a predetermined unit stroke of the transport belt 2 in the transport direction. The print control section 109 receives image data together with the ink ejecting pulse Ps from the main control section 101. The image data is reflected to the driving signal Sp, so that the ink ejection mode of the record head 7 (for example, color and density) is controlled.

Referring next to FIGS. 4A and 4B, the pulse generating section 105 and the contamination determining section 106 will be described. As shown in FIG. 4A, the pulse generating section 105 includes an amplifier circuit 110, a comparator 112 corresponding to a first-digital-signal output section, and a comparator 111 corresponding to a second-digital-signal output section.

The amplifier circuit 110 amplifies a waveform signal (hereinafter also referred to as an encoder signal) output from the detecting section 11 of the detecting apparatus 10 and sends the encoder signal to the comparators 111 and 112. The encoder signal has, for example, the waveform shown in part (A) of FIG. 5.

The comparator 112 is a hysteresis comparator that binarizes the output level (the output voltage) of the encoder signal with reference to a first threshold (a reference voltage). When the output level of the encoder signal exceeds a HIGH first threshold, the comparator 112 increases the output to HIGH and when the output level of the encoder signal falls below a LOW first threshold, the comparator 112 decreases the output to LOW, and sends the ink ejecting pulse Ps, corresponding to a first digital signal, as shown in part (C) of FIG. 5, according to the waveform cycle of the encoder signal.

The comparator 111 is a hysteresis comparator that binarizes the output level (the output voltage) of the encoder signal with reference to a second threshold (a reference voltage) higher in absolute value than the first threshold. When the output level of the encoder signal exceeds a HIGH second threshold, the comparator 111 increases the output to HIGH and when the output level of the encoder signal falls below a LOW second threshold, the comparator 111 decreases the output to LOW, and sends the contamination detecting pulse Pd, corresponding to a second digital signal, as shown in part (B) of FIG. 5, according to the waveform cycle of the encoder signal.

Part (B) of FIG. 5 shows an example in which, after the output level of the encoder signal falls below the LOW second threshold (point (d) of the encoder signal), the output level becomes not exceeding the HIGH second threshold (point (e) of the encoder signal), so that the output signal from the comparator 111 becomes LOW after the rectangular waveform stops (no rising edge and no trailing edge are generated, that is, after the state changes stop), as indicated by the solid line in part (B) of FIG. 5. On the other hand, for example, in the case where after the output level of the encoder signal exceeds the HIGH second threshold, the output level becomes not falling below the LOW second threshold, the output signal from the comparator 111 after the rectangular waveform stops becomes HIGH, as indicated by the chain double dashed line in part (B) of FIG. 5.

The threshold (reference voltage) of the comparator 111 can be adjusted using the ratio of resistance R1 to resistance R2. The threshold (reference voltage) of the comparator 112 can be adjusted using the ratio of resistance R3 to resistance R4.

As shown FIG. 4B, the contamination determining section 106 includes an up-down counter 113 and a latch circuit 114.

The up-down counter 113 starts counting-up synchronized with the clock signal Sc at a trailing edge of the contamination detecting pulse Pd and continues the counting-up until it receives a rising edge of the contamination detecting pulse Pd. The up-down counter 113 starts counting-down synchronized with the clock signal Sc at a rising edge of the contamination detecting pulse Pd and continues the counting-down until it receives a trailing edge of the contamination detecting pulse Pd.

Thus, the count indicates the time from the trailing edge to the rising edge (for counting-up) or the time from the rising edge to the trailing edge (for counting-down). Therefore, if the rising edge and the trailing edge of the contamination detecting pulse Pd are generated regularly, the counts change within a fixed range (between a maximum value and a minimum value) without going out of the fixed range.

The up-down counter 113 includes a count-data input section that receives input of data Se for designating a maximum count and a minimum count, that is, the maximum count and the minimum count can be designated from the outside. When the count exceeds a designated maximum value or falls below a designated minimum value, the up-down counter 113 sends a latch signal St to the latch circuit 114.

When receiving a reset signal Sr, the latch circuit 114 brings the output signal to LOW, and when receiving the latch signal St, the latch circuit 114 latches the output signal at HIGH. When the output signal (the contamination detection signal Sd) from the latch circuit 114 changes from LOW to HIGH, the CPU 102 controls the cleaning unit 21 to execute the cleaning of the target section 12.

Referring to FIGS. 5 and 6, the above operation will be further described. When the output level of the encoder signal exceeds the first threshold and the second threshold (points (a) to (d) in part (A) of FIG. 5), both of the contamination detecting pulse Pd and the ink ejecting pulse Ps are output, so that an ink discharge operation onto the recording paper P is executed in synchronism with the state change of the ink ejecting pulse Ps.

When the detection sensitivity of the target section 12 begins to decrease because of contamination, such as ink mist, first, the output level of the encoder signal falls below the second threshold higher than the first threshold (points (e) to (h) in part (A) of FIG. 5, so that the state change of the contamination detecting pulse Pd stops, as shown in part (B) of FIG. 5.

At that time, the encoder signal has an output level higher than a certain level, that is, a level higher than the first threshold, so that a substantially normal paper transport amount is detected. Thus, the ink ejecting pulse Ps continues in state change.

The contamination determining section 106 is configured to start counting-up synchronize with the clock signal Sc at a trailing edge of the contamination detecting pulse Pd and to continue the counting-up until it receives a rising edge. The contamination-state determining section 106 is also configured to start counting-down synchronize with the clock signal Sc at a rising edge of the clock signal Sc and to continue the counting-down until it receives a trailing edge next.

Accordingly, for example, when counting-up is started at a trailing edge of the contamination detecting pulse Pd but the state change of the contamination detecting pulse Pd stops, as shown in part (B) of FIG. 5, and a predetermined time passes, with the output from the pulse generating section 105 (the comparator 111) held at LOW, the count exceeds a designated maximum value.

Thus, the latch signal St is output to the latch circuit 114, so that the contamination detection signal Sd is latched at HIGH, as shown in part (D) of FIG. 5. Accordingly, the CPU 102 can determine that the target section 12 is contaminated as the contamination detection signal Sd output from the contamination determining section 106 is switched from LOW to HIGH.

On the other hand, when, after the contamination-state determining section 106 starts counting-down synchronized with the clock signal Sc at a rising edge of the contamination detecting pulse Pd, the output of the contamination detecting pulse Pd stops, and a predetermined time passes, with the output from the pulse generating section 105 (the comparator 111) at HIGH (the example indicated by the chain double-dashed line in part (B) of FIG. 5), the count falls below a designated minimum value. Thus, the latch signal St is output to the latch circuit 114, so that the contamination detection signal Sd is latched at HIGH, as shown in part (D) of FIG. 5. Accordingly, the CPU 102 can determine that the target section 12 is contaminated.

The CPU 102 can thus determine that the target section 12 is contaminated from the switching of the contamination detection signal Sd output from the contamination determining section 106 from LOW to HIGH, as described above. The control unit 100, however, does not always control the cleaning unit 21 to clean the target section 12 immediately even if it determines that the target section 12 is contaminated. This will be described with reference to FIG. 6.

At the start of a print job, first, a contamination detection flag is set to 0 (not contaminated) (step S101). Next, printing is started (step S102) and, thereafter, the status of the contamination detection signal Sd is monitored (step S103). When the contamination detection signal Sd switches from LOW to HIGH (Yes in step S103), the contamination detection flag is set to 1 (contaminated) (step S104).

Here, it is determined whether printing of the current print page has been completed (step S105). If it has not been completed (No), the printing is continued until completed. If the printing of the current print page has been completed (Yes), a variable N indicative of the number of execution of cleaning is set to 0, and the cleaning unit 21 is controlled to execute a cleaning operation (step S107) and the variable N indicative of the number of execution of cleaning is increased (step S108).

After the cleaning operation, a dummy transport operation to drive only the transport belt 2 without executing printing is executed (step S109), and the status of the contamination detection signal Sd, that is, whether the output level of the encoder signal has recovered to a value exceeding the second threshold as a result of the cleaning of the target section 12 is determined (step S110).

If no contamination of the target section 12 is detected as a result of the cleaning operation (No in step S110), the contamination detection flag is returned to 0 (step S111), and when the next page must be printed, the process is returned to step S102 (Yes in step S112).

If it is determined that the contamination of the target section 12 remains as a result of the cleaning operation (Yes in step S110), it is determined whether the variable N indicative of the number of execution of cleaning is smaller than or equal to a predetermined maximum number a (step S113). If the variable N does not exceed the maximum number α (Yes), the cleaning operation is executed again. If the variable N exceeds the maximum number α (No in step S113), it is determined that the target section 12 is so contaminated that it cannot be cleaned or another abnormality has occurred, and an error indication is given.

As described above, the control unit 100 uses two thresholds (the first threshold and the second threshold higher than the first threshold) for the output level of the encoder signal output from the detecting section 11 of the detecting apparatus 10; the control unit 100 uses the first threshold to generate a detection signal (the ink ejecting pulse Ps), which is the detection result of the target section 12 (that is, the amount of transportation of paper) and uses the second threshold to generate a signal for determining the state of contamination of the target section 12 (the contamination detecting pulse Pd).

Even if it is determined that the target section 12 is contaminated, the state change of the ink ejecting pulse Ps is continued under predetermined condition, that is, as long as the encoder signal exceeds the first threshold. Therefore, the printing can be continued using the ink ejecting pulse Ps even if it is determined that the target section 12 is contaminated, so that the printing operation on the recording paper P can be completed without interrupting or stopping the recording operation halfway. This prevents the recording paper P from being wasted and the recording quality from being deteriorated.

In this embodiment, the contamination detecting pulse Pd output from the pulse generating section 105 is input to the contamination determining section 106, and the contamination determining section 106 determines the state of the contamination detecting pulse Pd. Alternatively, the contamination detecting pulse Pd output from the pulse generating section 105 may be input directly to the CPU 102, and the CPU 102 may determine the state of the contamination detecting pulse Pd.

In this embodiment, the control unit 100 is configured not to execute the cleaning of the target section 12 immediately after it is determined that the target section 12 is contaminated during printing but to complete the printing of the current print page and then execute cleaning. This prevents the recording quality from being deteriorated as in the case where printing is stopped halfway and then started again.

Furthermore, it is determined whether the output level of the encoder signal has recovered to a value exceeding the second threshold every time one cleaning operation is executed. This prevents excessive cleaning as in the case where a predetermined number of cleaning operations is executed to thereby reduce the downtime of the apparatus and minimize the wear of the target section 12.

The detecting apparatus of this embodiment includes the cleaning unit 21. When it is determined that the target section 12 is contaminated, the cleaning unit 21 is controlled to clean the target section 12. The apparatus may also be configured to give a warning indication that the target section 12 is contaminated irrespective of whether the cleaning unit 21 is provided to warn the user to clean the target section 12.

Since the detecting apparatus of this embodiment is configured such that the maximum count and the minimum count of the up-down counter 113, that is, reference values for determining whether the contamination detecting pulse Pd has been output (whether the target section 12 is contaminated) are variable, the determination can be made using appropriate reference values corresponding to the driving speed and speed changes of the transport belt 2 (irregularities in the rotation of the motor) or the like.

For example, since the moving speed of the transport belt 2 depends on the recording mode (high quality, fast print speed and so on) when printing on the recording paper P, the maximum value and the minimum value may be set to match the recording mode.

Although the detecting apparatus of the embodiment is applied to the detection of the operation of the transport belt 2 (the determination of the paper transportation amount), the invention is not limited to that. For example, the detecting apparatus may be applied to the detection of the operation (position and speed) of the carriage of a recording unit which moves back and forth in the main scanning direction. In this case, the detecting section 11 is disposed at the carriage (moving part) and the target section 12 is disposed at the apparatus main body (fixed part).

Also in such a form, the moving speed of the carriage sometimes depends on the recording mode. Therefore, the maximum value and the minimum value are set in correspondence with the recording mode. Since the carriage has an accelerating section and a decelerating section on both sides of a constant speed section, the maximum value and the minimum value are switched in accordance with the position of the carriage when contamination detection is performed in such sections.

Other various changes and modifications of the invention are possible; that is, the invention may have any configuration in which the first threshold and the second threshold higher than that are applied to the output level of the encoder signal, and the second threshold is used to determine the state of the contamination of the target section, and the first threshold is used to determined the position, speed and so on of the moving body.

What is claimed is:

1. A detecting apparatus comprising:

a target section in which target elements to be detected are arranged in the direction of the motion of a moving body;

a detecting section that detects the target elements with the motion of the moving body and outputs a waveform signal having an output level corresponding to a contamination level of the target section;

a first-digital-signal output section that binarizes the waveform signal with reference to a first threshold to output a first digital signal;

a second-digital-signal output section that binarizes the waveform signal with reference to a second threshold which is higher in absolute value than the first threshold to output a second digital signal; and a determining section that determines whether the second digital signal has changed in status.

2. The detecting apparatus according to claim 1, further comprising:

a cleaning unit that cleans the target section; and a control section that controls the cleaning unit to execute the cleaning of the target section when the determining section determines that the second digital signal has not changed in status.

3. The detecting apparatus according to claim 1, wherein the determining section includes:

a latch circuit that latches the output signal at HIGH or LOW by receiving a latch signal;

an up-down counter that starts counting-down synchronized with a clock at a rising edge of the second digital signal and starts counting-up synchronized with the clock at a trailing edge or, alternatively, starts counting-up synchronized with the clock at a rising edge and starts counting-down synchronized with the clock at a trailing edge, wherein when the count exceeds a maximum value or when the count falls below a minimum value, outputs a latch signal to the latch circuit; and a count-data input section that receives input of data for designating the maximum value or the minimum value of the count.

4. A recording unit comprising:

a transport belt that forms a transport surface moving in the direction of transportation of a recording medium;

a target section, provided on the transport belt, in which target elements to be detected are arranged in the direction of the transportation of the recording medium;

a detecting section that detects the target elements with the movement of the transport surface and outputs a waveform signal having an output level corresponding to a contamination level of the target section;

a first-digital-signal output section that binarizes the waveform signal with reference to a first threshold to output a first digital signal;

a recording unit that executes a recording operation on the recording medium in accordance with the first digital signal;

a second-digital-signal output section that binarizes the waveform signal with reference to a second threshold which is higher in absolute value than the first threshold to output a second digital signal; and a determining section that determines whether the second digital signal has changed in status.

5. The recording unit according to claim 4, further comprising:

a cleaning unit that cleans the target section; and a control section that, when the determining section determines that the second digital signal has not changed in status, controls the cleaning unit to execute the cleaning of the target section after completion of the current recording on a recording medium.

6. The recording unit according to claim 4, wherein the determining section includes:

a latch circuit that latches the output signal at HIGH or LOW by receiving a latch signal;

an up-down counter that starts counting-down synchronized with a clock at a rising edge of the second digital signal and starts counting-up synchronized with the clock at a trailing edge or, alternatively, starts counting-up synchronized with the clock at a rising edge and starts counting-down synchronized with the clock at a trailing edge, wherein when the count exceeds a maximum value or when the count falls below a minimum value, outputs a latch signal to the latch circuit; and a count-data input section that receives input of data for designating the maximum value or the minimum value of the count.

* * * * *